United States Patent [19]
Hart et al.

[11] 3,890,046
[45] June 17, 1975

[54] CONDENSATION NUCLEUS DISCRIMINATOR

[75] Inventors: Edwin J. Hart, Hinsdale; Keelathur N. Vasudevan, Chicago; Klaus H. Schmidt, Downers, all of Ill.

[73] Assignee: The United States of America as represented by the United States Energy Research and Development Administration, Washington, D.C.

[22] Filed: May 9, 1974

[21] Appl. No.: 468,324

[52] U.S. Cl. .................. 356/37; 356/102; 356/103
[51] Int. Cl. ............................................. G01n 1/00
[58] Field of Search ...................... 356/37, 102, 103

[56] References Cited
UNITED STATES PATENTS

| | | | |
|---|---|---|---|
| 3,203,309 | 8/1965 | Skala et al. | 356/37 |
| 3,632,210 | 1/1972 | Rich | 356/37 |
| 3,671,128 | 6/1972 | Radke et al. | 356/37 |
| 3,850,524 | 11/1974 | Kanter | 356/103 X |

Primary Examiner—Palmer C. Demeo
Attorney, Agent, or Firm—Dean E. Carlson; Arthur A. Churm; Hugh W. Glenn

[57] ABSTRACT

A device for determining the critical radius and the absolute concentration of condensation nuclei within gas samples during a single interval of pressure reduction is disclosed. The device includes means for monitoring the pressure along with the transient changes in the scattering and attenuation of a monochromatic light beam passing through a cloud of fog droplets during their growth from the nuclei in the sample. From these measurements useful data respecting aerosol formation can be obtained for environmental studies and basic research.

12 Claims, 7 Drawing Figures

CONDENSATION NUCLEUS DISCRIMINATOR

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a device and method for determining both the size and concentration of extremely small particles, of 200 angstroms radius or less, that can provide nuclei for condensation of water or other vaporous materials. The development is particularly suitable for use in the environmental sciences where it is most desirable to detect extremely small and nonvisible droplets or particles. For the purposes of this application, the term "particles" shall include solid particles, liquid droplets and solute dissolved or dispersed within liquid droplets.

Significant amounts of air pollutants are spewed out as colloidal size particles from factories, homes, automobiles and other sources of pollution. Other small nuclei are produced by the conversion of gas, e.g., $SO_2$ subjected to beta or other radiation, to submicroscopic or colloidal size particles either at the pollutant source or by reactions initiated in the air. In exhaust gas cleanup systems, large hygroscopic particles are easily washed away or fall out by gravity, but the smaller particles that may become condensation nuclei are much more resistant to this removal mechanism. Even when visible smoke from a chimney or other source of exhaust has been removed, the small size pollutants or their gaseous precursors may remain. The removal of the visible discharge may produce a worsened condition if one considers that vaporizing a particle 50 $\mu$m in diameter can produce about 15 million particles 0.2 $\mu$m in diameter.

In order to monitor exhaust streams that may contain invisible pollutants, condensation nucleus counters have been developed. Previous counters have produced high supersaturation of water vapor in air samples as in a cloud chamber, causing the nucleus to rapidly grow to several micrometers in size. The enlarged particles can then be studied by measuring light-scattering and attenuation after the expansion. The concentration of particles within the resultant fog bears a relationship to the manner in which the original light intensity is scattered or transmitted. The calibration of techniques involving these variables can be made periodically by making photomicrographs and actually counting the number of particles scattering light. This procedure is, of course, most tedious and time-consuming.

The inventors have found a useful improvement over the conventional cloud chamber techniques by recording transient changes in the attenuation and scattering of a monochromatic light beam by a cloud of growing fog particles during an interval of decreased pressure. Both the critical radius and the absolute concentration of nuclei can be determined. The term "absolute concentration" refers to the number of nuclei determined without reference to separate calibration with known samples. This improvement, with further background on state of the art techniques, is presented in the inventors' recent article, "Condensation Nucleus Discriminator Making Optical Measurements on a Fog: A Tool for Environmental Research," *Science*, Vol. 180, pages 1064–1067, 8 June 1973.

SUMMARY OF THE INVENTION

It is an object of the present invention to provide an instrument and method for the rapid and accurate determination of the number and critical radius of condensation nuclei.

It is also an object of this invention to provide means for determining the critical radius and absolute concentration of submicroscopic particles through measurements of transient changes during a single interval of expansion and particle growth.

In accordance with the present invention, a condenation nuclei discriminator is presented which includes a chamber for receiving an air sample having condensation nuclei of unknown size and concentration. Means are provided for performing an adiabatic expansion of the sample from known conditions in order to promote growth of fog particles seeded by the nuclei. During the growth interval, a beam of monochromatic light is projected through the chamber while scattering and attenuation of the beam is monitored. Simultaneously, the system pressure is monitored in order to afford determination of the supersaturation of the system throughout the growth period. From the transient changes in scattered light, direct light and the system pressure, the absolute concentration and the critical radius of the nuclei can be determined.

BRIEF DESCRIPTION OF THE DRAWINGS

The present invention is illustrated in the accompanying drawings wherein:

FIG. 1a is a cross-sectional view of an optical mask used in the discriminator of FIG. 1.

FIG. 1b is a cross-sectional view of a complementary mask to that shown in FIG. 1a, also used in the FIG. 1 discriminator.

DETAILED DESCRIPTION OF THE PREFERRED EMBODIMENT

Figure 1:
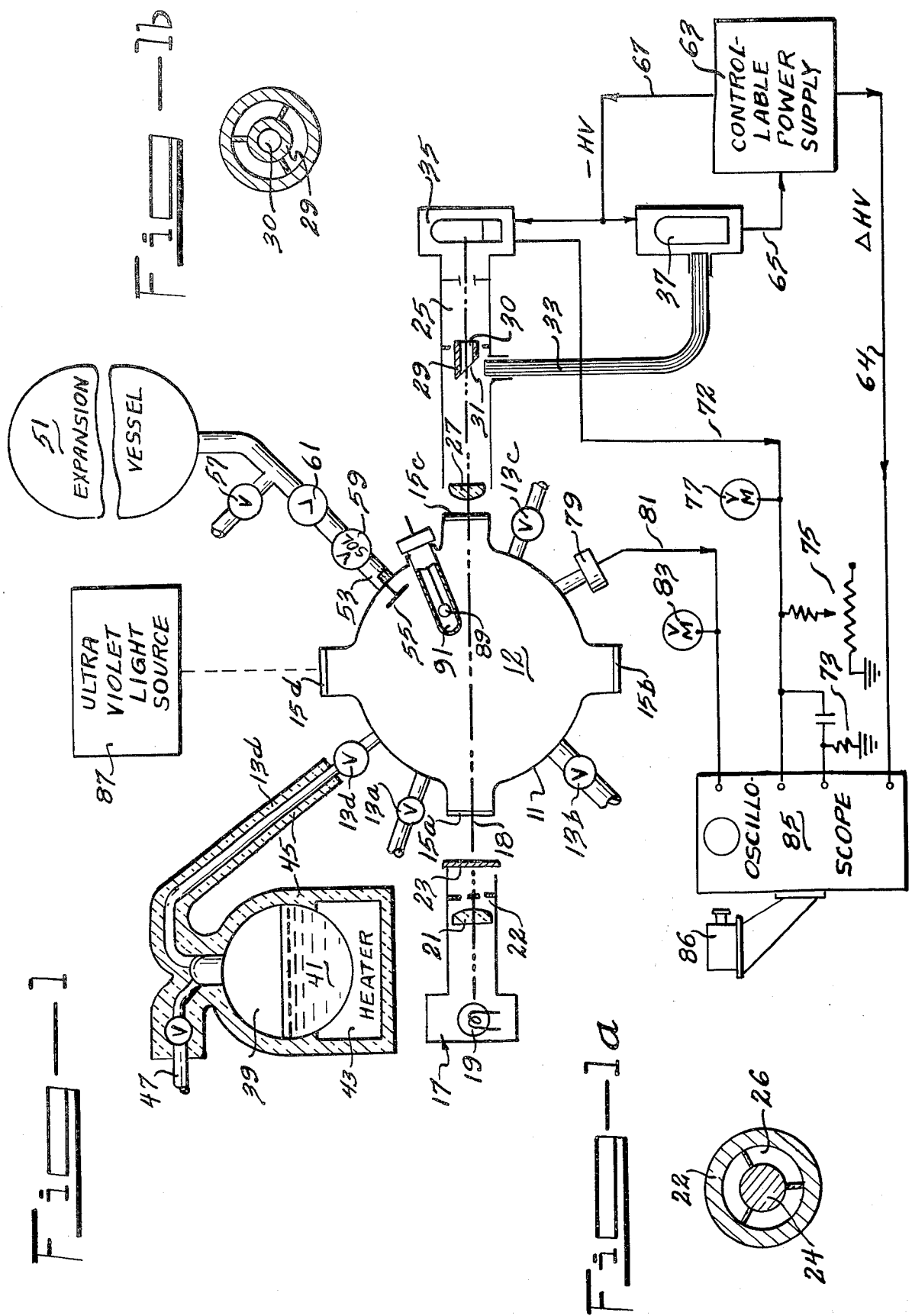
FIG. 1 is a schematic diagram of a condensation nuclei discriminator.

In FIG. 1, a nuclei discriminator is illustrated for measuring the transient changes of a light beam within a fog or a cloud having growing fog particles. A housing 11 includes an internal chamber 12 for containing the sample during particle formation and growth. The housing is provided with a number of ports or openings for introducing the sample and carrying out the experimental measurements. For example, the valved ports shown at 13a, 13b, 13c and 13d are used for the introduction of sample diluent and water vapor as well as for the initial evacuation of the chamber. Various windows consisting of flat transparent material such as silica or pyrex glass are illustrated within the housing walls at 15a, 15b, 15c and 15d. The windows are used for transmitting light into the chamber.

A collimated light source 17 is aligned with window 15a in order to project a beam 18 of near monochromatic light through inner chamber 12 of housing 11. The illustrated light source includes a tungsten iodide lamp 19, a collimator lens 21 and an interference filter 23 which transmits a narrow spectra range of light. A light mask 22, shown in section in FIG. 1a, includes an opaque portion 24 surrounded by an annular opening 26 for forming light beam 18 into a tubular configuration. A light source of this type can provide a beam of monochromatic light having a wavelength of, for example, 433 nanometers which has been found to be suitable for use in the presently described nuclei discriminator.

At window 15c opposite the light source 17 is positioned a light tube 25 for receiving beam 18. The beam is collected in analyzer lens 27 and projected onto the end face 31 of a second light mask 29. Mask 29 is a complement to mask 22, as it includes an open center portion 30 surrounded by a solid, opaque annulus. As illustrated in FIG. 1 and FIG. 1b, mask 29 is a short tube piece of sufficient wall thickness centered within light tube 25. End face 31 of the tube piece is cut at an angle of 45° to the tube axis and polished to an optical surface.

In order to collect transmitted light reflected from surface 31, a glass fiber cable 33 is coupled through the light tube 25 wall at a point in longitudinal alignment with surface 31 and is oriented perpendicular to light tube 25 and light beam 18. First and second photomultiplier devices 35 and 37 are positioned at the end of both light tube 25 and glass cable 33 so as to receive light passing through these passageways.

In operating the above-described light system, a tube-shaped light beam 18 is projected through mask 22 and the internal chamber 12 into light tube 25. Forward scattered light is deflected away from optical surface 31 in light mask 29 and continues along light tube 25 to be received by photomultiplier 35. Direct or transmitted light impinges on optical surface 31 and is reflected into glass cable 33 to photomultiplier 37. Photomultiplier devices 35 and 37 are of a matched pair, that is each tube responds nearly identically to changes in light or high-voltage input. This permits the output of device 37 to be used in compensation for the total attenuation by fog particles of scattered light striking device 35.

A reservoir 39 containing a liquid, for instance water 41, is shown connected into valved outlet 13d of housing 11. A second outlet 47 from the reservoir 39 is connected to a vacuum source (not shown) for the initial evacuation of air. The reservoir is maintained at a suitable temperature, e.g., 30°C., by a heater 43 and insulation 45 in order to provide a supply of water vapor for humidifying the sample gas within chamber 12.

In order to provide a pressure reduction and expansion of the humidified sample gas, a vessel 51 with a valved outlet 57 for its evacuation is connected to housing 11 through port 53. The volume of vessel 51 is substantially larger than that of chamber 12 in order to obtain a consistent expansion. For example, a reasonable size for vessel 51 is about 50 liters for use with a two-liter sample chamber 12.

A remotely operated valve 59, such as an electrically controlled solenoid valve, is installed within the connection of chamber 12 and vessel 51. This valve 59 is synchronized with the system instrumentation to open when initiation of the expansion is desired. To control the rate of expansion, a needle valve 61 or other variable orifice means is interposed between valve 59 and the inner volume of evacuable vessel 51. Port 53 is equipped with a shield 55 to provide increased uniformity in the expansion of the sample throughout chamber 12. Shield 55 directs flow into port 53 from circumferential regions of chamber 12 and thereby tends to minimize localized expansion.

The system instrumentation includes an operational or controllable power supply 63 for supplying high voltage to photomultiplier devices 35 and 37. One power source found to be suitable for this purpose is a Kepko Model OPS 1000 Operational Power Supply 0–1000 V and 0–20 mA. The output of photomultiplier device 37 is a measure of the direct or transmitted light. This output is coupled through line 65 as a feedback into power supply 63. Suitable control circuitry is provided in the power supply to vary its high-voltage output in line 67 by the amount necessary to maintain output 65 at a constant level. In addition, power supply 63 is provided with the necessary circuitry to produce a second output 64 that is proportional to the change in high voltage. As will be appreciated, output 64 will bear a nearly proportional relationship to the light absorbance within chamber 12.

Photomultiplier tube 35 generates an output 72 representing scattered light which is transmitted to and monitored by voltmeter 77. Circuitry for zero adjustment 75 and differentiation 73 are also provided in modification of output 72. Another output for characterizing the sample expansion is provided by a conventional pressure transducer 79. Its output 81 is proportional to the total pressure within chamber 12 and is monitored by suitable voltmeter 83 calibrated in pressure units.

The outputs mentioned above, 81, 72, 64 and that provided by differentiation circuitry 73, are all monitored by a commercially available oscilloscope 85. The oscilloscope 85 has at least four inputs and means for recording each of these inputs over a time period sufficient to carry out the expansion in chamber 12. A typical time period of 0.1 to 2 seconds is used for this purpose. A camera 86, suitably mounted onto the oscilloscope structure, is illustrated as means for permanently recording the oscilloscope traces.

In some instances, condensation nuclei are produced as a result of photochemical or other radiation catalyzed reactions. To initiate such a reaction, an ultraviolet light source 87 is shown aligned with window 15d to permit exposure of the sample within chamber 12. Alternatively, a radioisotopic source 89 of gamma or beta radiation is shown positioned within a well 91 which sealingly penetrates the wall of housing 11 into the central region of chamber 12.

In conducting measurements for the determination of critical radius and concentration of condensation nuclei, chamber 12 is first evacuated such as through valved outlet 13c. About 10 to 20 Torr of water vapor is bled into chamber 12 from the vapor reservoir 39. This is conveniently accomplished by maintaining the water in reservoir 39 at about 30°C. A suitable pressure of sample gas, for instance about 100 Torr, is next admitted through port 13a and, if desired, a diluent of, for instance, filtered air is bled in through port 13b. In those instances where a radiation-induced reaction is required for producing condensation nuclei, the radiation source 89 or ultraviolet light source 87 is positioned either within chamber 12 or in alignment with window 15d.

After the sample mixture with condensation nuclei is prepared, an adiabatic expansion is initiated by opening valve 59 to couple evacuated vessel 51 with chamber 12. Control valve 61 is previously adjusted to control the rate of the expansion. As the expansion proceeds, the temperature within chamber 12 decreases, thus causing a supersaturation of water vapor within the sample mixture. When the supersaturation reaches a critical level, e.g., that which corresponds to the critical radius of the condensation nuclei, the nuclei begin to grow as particles, i.e., droplets of water with nuclei solute. When the growing particles reach a radius of about equal to the wavelength of the monochromatic light source 17, a prodigious increase in light scattering sets in.

The scattered light is measured with an optical instrumentation arrangement as described above. The image of mask 22 acts as a virtual light source and is projected on the slanted optical surface 31 of complementary mask 29. The scattered light is diverted from surface 31 and passes on to be received by photomultiplier 35. The direct light impinges on the 45° surface 31 and is reflected into tube 33 for conduction to photomultiplier 37. Since the instrumentation in the variable power supply controls the high voltage to the two photomultipliers at a sufficient level to keep the output from photomultiplier 37 constant, the signal from photomultiplier 35 thus represents the scattered light undistorted by attenuation, while the change in high voltage from power supply 63 is very closely proportional to the light absorbance. These relationships come into effect when photomultipliers 35 and 37 are a closely matched pair with their outputs responding nearly identically to high-voltage input and light intensity.

Figure 2:
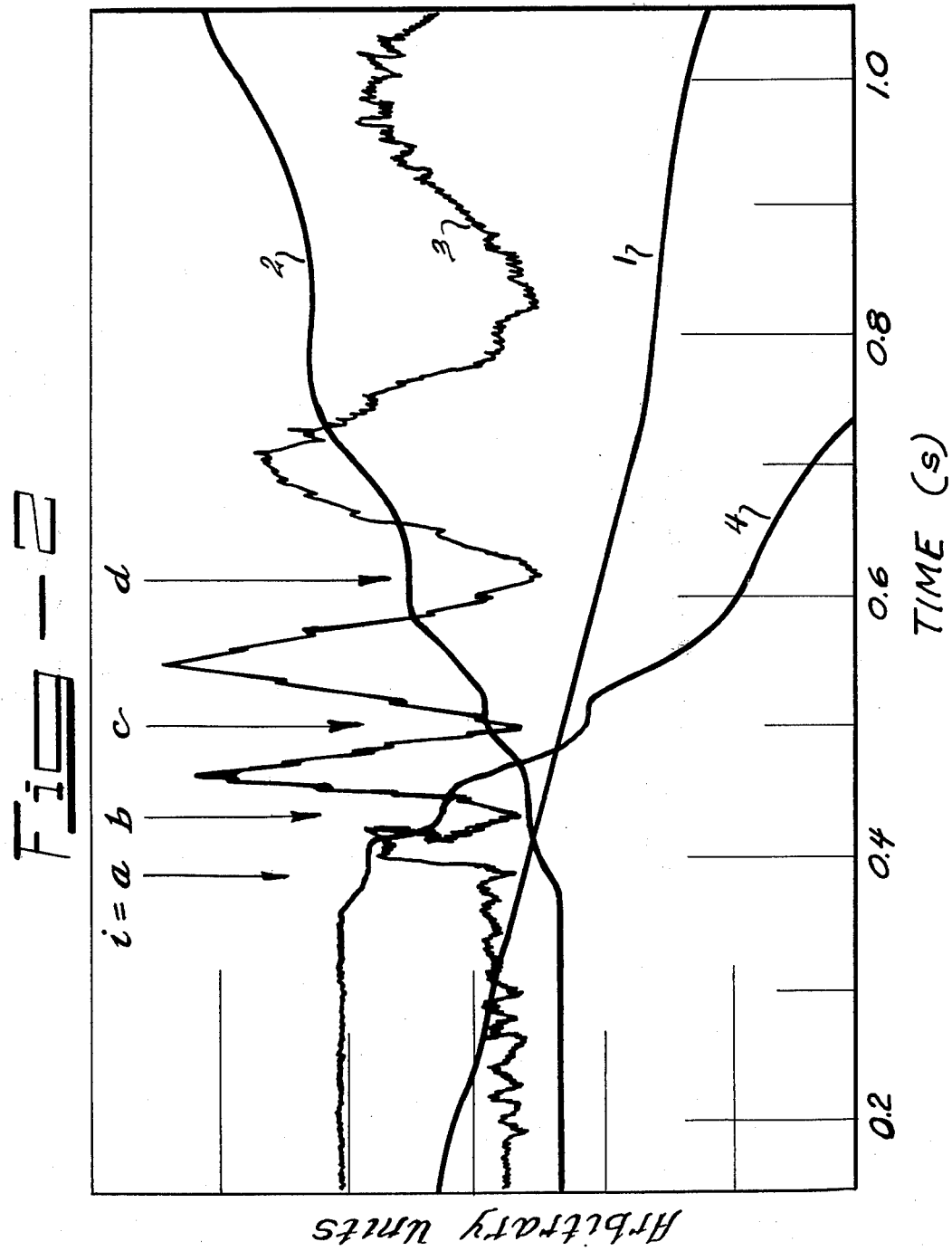
FIG. 2 is a plot of typical oscilloscope traces obtained with air-conditioned laboratory air. Trace 1 represents pressure change; Trace 2, scattered light; Trace 3, first time derivative of Trace 2; and Trace 4, light absorbance (with inverse slope for clarity).

During the expansion and droplet growth period, the output representing pressure at 81, forward scattered light at 72, differential of forward scattered light at 73 and the absorbance at 64 are recorded with oscilloscope 85 and camera 86. A typical oscilloscope picture obtained with air-conditioned laboratory air is shown in FIG. 2. Trace 1 represents the pressure, trace 2 the scattered light, trace 3 the first derivative of trace 2 and trace 4 the light absorbance, defined as the logarithm to the base 10 of original to direct light intensity. For purposes of clarity in the trace, the light absorbance is shown on an inverse scale; that is, the absorbance increase during the adiabatic expansion is shown with a downward slope.

Figure 3:
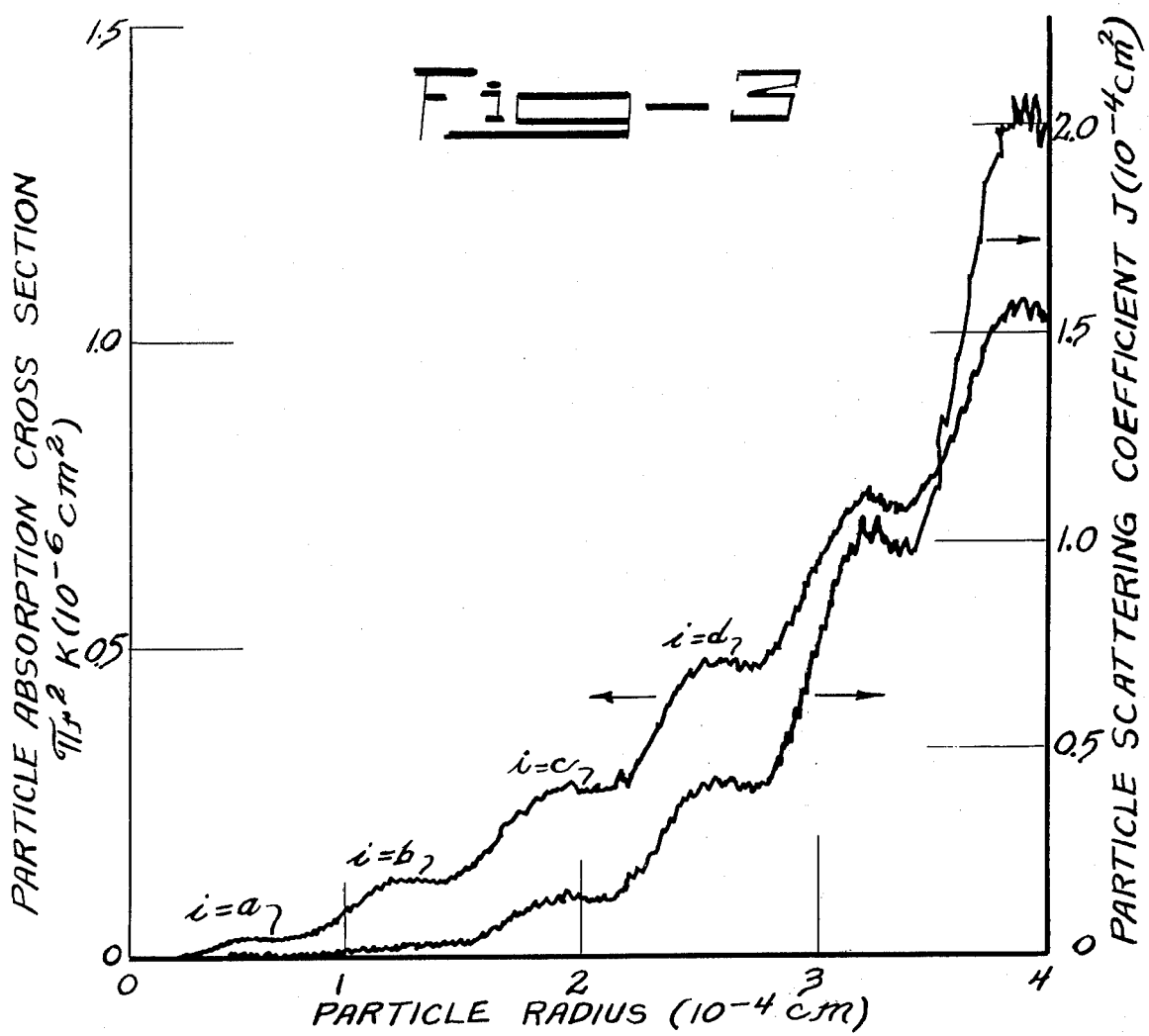
FIG. 3 is a graph showing calculated scattering functions in respect to particle radius for nonabsorbing water droplets with an index of refraction of 1.34.

The curves in FIG. 3 are calculated from appropriate functions pertaining to light scattering by spherical particles found in National Bureau of Standards, *Tables of Scattering Functions for Spherical Particles* (Government Printing Office, Washington, D.C., 1949), page ix; R. O. Gumprecht and C. M. Sliepcevich, *Tables for Light-Scattering Functions for Spherical Particles* (University of Michigan Press, Ann Arbor, 1951), page x; *Tables of Riccati-Bessel Functions for Large Arguments and Orders* (University of Michigan Press, Ann Arbor, 1951), page xii. The curves are calculated at a scattering angle of 180° (forward direction) for spherical, nonabsorbing water droplets with an index of refraction of 1.34 with monochromatic unpolarized light at a wavelength of 433 nanometers. In accordance with Mie's theory of light scattering the relationship of the coefficients $J$ and $K$ to the initial direct and scattered light is given by the following equations:

$$I_d = I_0 e^{(-n \pi r^2 K d)} \qquad (1)$$

$$dI_s = I_d J n dV / X^2 \qquad (2)$$

where: $I_0$ is incident light intensity, $I_d$ direct light intensity, $I_s$ scattered light intensity, $n$ droplet concentration per unit volume, $d$ path length, $dV$ the scattering volume and $X$ the distance from $dV$.

Figure 4:
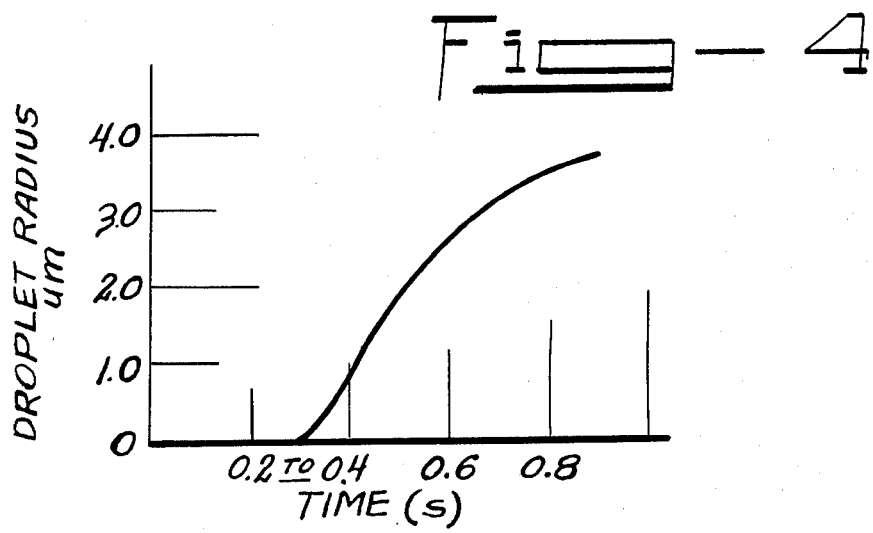
FIG. 4 is a typical plot showing droplet growth as a function of time derived from data like that shown in FIGS. 2 and 3.

With the aid of the calculated curves in FIG. 3 and the oscilloscope traces in FIG. 2, a particle or droplet growth curve as shown in FIG. 4 can be plotted. Each of the steps or plateaus in traces 2 and 4 on the oscilloscope picture correspond to short intervals of reduced change in scattered light intensity, that is, to the minimums on trace 3 representing the differential of scattered light. With the aid of the calculated curves, the droplet radius corresponding to the center of each plateau in the particle-absorption-cross-section function is said to correspond to the time at which a minimum occurs in trace 3. The first four of these plateaus and minimums are labeled $i = a, b, c$ and $d$ in FIGS. 2 and 3. FIG. 4 is thus plotted and extrapolated to the time axis to obtain the time at which droplet growth begins ($t_o$). Returning to the oscilloscope trace, the exact conditions within the expanding gas sample can be determined at time $t_o$ for determining the critical radius of nuclei.

The relation between the critical radius $r_c$ of a liquid droplet and the minimum supersaturation at which it can survive and grow is given by:

$$r_c = 2 M \sigma_L / \rho_L RT \ln(p/P_\infty) \qquad (3)$$

where: $M$ is molecular weight, $\sigma L$ is surface tension, $\rho L$ is density of the liquid, $R$ is the gas constant, $p$ is the pressure of the supersaturated vapor and $P_\infty$ is the equilibrium vapor pressure at temperature $T$.

The inventors have found in measuring the transient changes of droplet growth over short time intervals, in the order of 0.1 to 2 seconds, that available temperature monitors would not respond quickly enough. Consequently, the temperature in equation (3) was calculated from the initial temperature and the temperature resulting from an adiabatic expansion from the initial pressure to the pressure at $t_o$. Similarly, the pressure of the supersaturated water vapor was calculated from the initial water vapor pressure and over-all pressure reduction during the expansion. The other physical properties in equation (3) can in many instances be presumed to be the values for condensed water at the pressure and temperature of the system. In calculating the critical radius in this manner, it should be pointed out that $r_c$ is more accurately defined as that radius of water drop which starts condensation at the same value of saturation as the unknown particle and that it may or may not be the actual physical radius of the nuclei.

The concentration of nuclei can be calculated from the absorbance as displayed on trace 4 of FIG. 2. By using the formula:

$$n = \frac{A_i \ln 10}{(\pi r^2 K)_i d} \quad (4)$$

where: $A_i$ is absorbance measured at a time corresponding to one or more valleys within trace 3 of FIG. 2, $(\pi r^2 K)_i$ is the particle absorption cross section from FIG. 3 at the plateau corresponding to the absorbance $A_i$, $d$ is the path length or distance across chamber 12 shown in FIG. 1, ln 10 is the natural logarithm of 10 (approximately 2.3) introduced on deriving equation (4) from equation (1).

It was found that an increasing deviation between the observed and the calculated ratios of successive plateaus in the absorbance and, to a larger degree, in the scattering curves occurred at the plateaus towards the end of the interval. However, the values of nuclei concentration obtained from equation (4) for the first two plateaus or valleys in trace 3 show good agreement. For the laboratory air sample, an absolute nuclei concentration of $19,160 \pm 1500$ nuclei per cm$^3$ was obtained. This absolute result is obtainable in a single test run without having to rely on data accumulated by testing known samples.

Other tests on the reliability and reproducibility of the nuclei discriminator were made by irradiating a humidified SO$_2$ mixture with Sr$^{90}$-Y$^{90}$ beta rays to produce a fairly constant level of sulfate nuclei. Readings obtained on two separate samples were $4.6 \times 10^4$ and $3.9 \times 10^5$ nuclei per cm$^3$. These readings fairly agreed with those obtained with a commercially available Gardner Associates Small Particle Detector, Type CN, Cat. No. 70004G-2, Schenectady, N.Y. The corresponding readings were $4 \times 10^4$ and $3.8 \times 10^5$ with the Gardner instrument.

Figure 5:
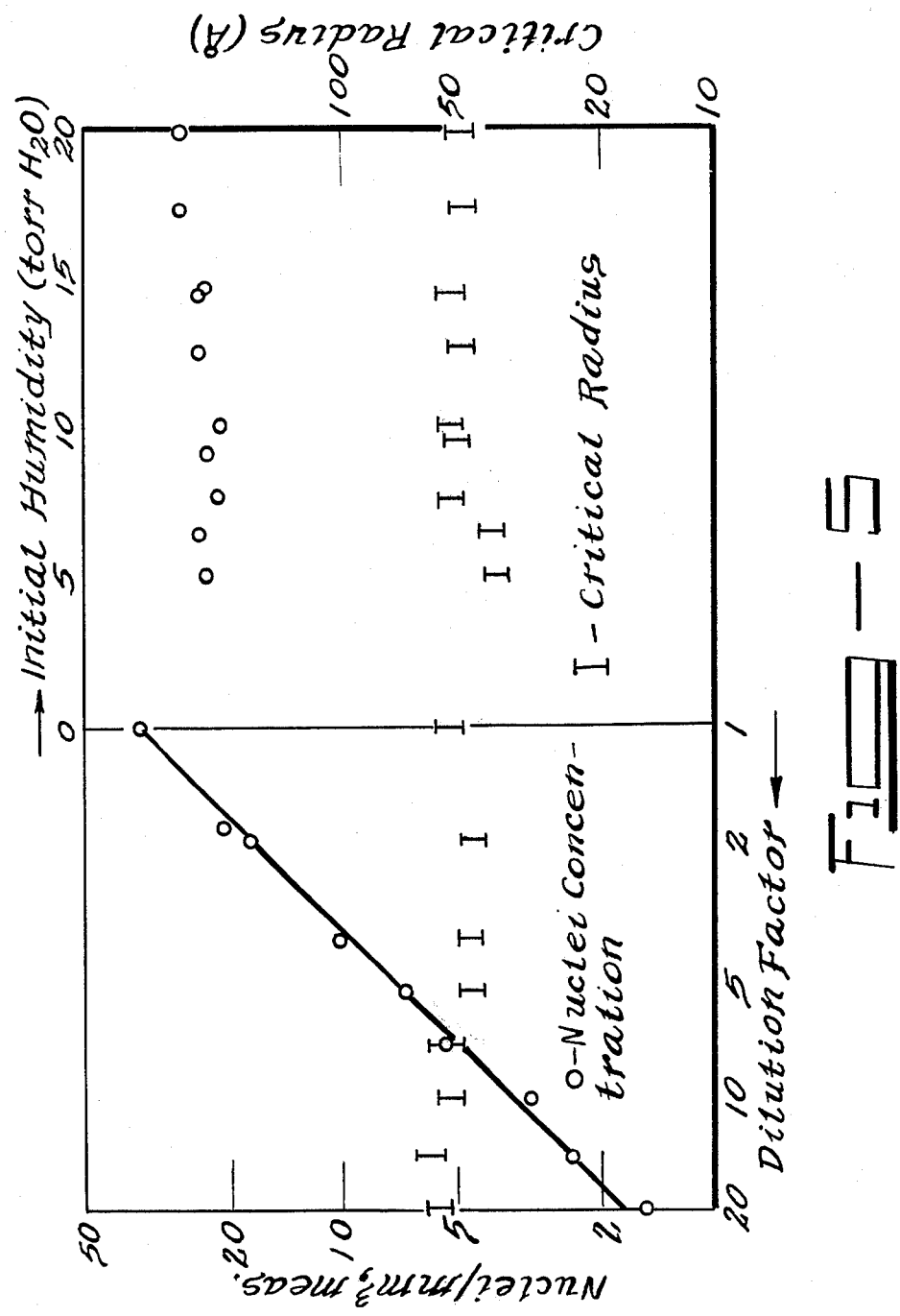
FIG. 5 is a plot of measured nuclei concentration and critical radius of a sulfate aerosol made as a function of dilution and of initial humidity.

A number of experiments were run to determine the effect of dilution and initial humidity on the measured nuclei concentration and the critical radius determinations. The data from these experiments are shown in FIG. 5 with the left-hand part of the graph corresponding to variable dilution and the right-hand corresponding to variable initial humidity. The variable dilution data were generated by diluting each sulfate aerosol sample with filtered tank air up to about 20 times, while maintaining a constant humidity of about 20 Torr at about 24°C. Readings on the humidified tank air alone gave no measurable signal. The plot of dilution factor versus nuclei concentration shows satisfactory proportionality as would be expected in accurate experimental data. Furthermore, dilution caused no significant variation in the measured critical radius, which further substantiates the measured results.

The right-hand portion of FIG. 5 demonstrates that initial humidity has little or no effect on $n$ or $r_c$ as measured with the present discriminator. It can be seen that in the series of experiments where initial humidity was varied from 5 to 20 Torr no significant trends developed in either the critical radius or the nuclei concentration. Since the expansion required for the beginning of droplet growth varies from 1.094 to 1.49 as the initial humidity is varied from 20 to 5 Torr and since these experiments produced fairly constant readings of $n$ and $r_c$, it also can be concluded that the expansion was, in effect, adiabatic.

One limitation noted for use of the present method is that unambiguous determination of the critical radius is only possible if the prevalent type of nuclei has a narrow size distribution. This is generally observed in laboratory air, as is illustrated in FIG. 2. In the case of a bimodal distribution with sufficient separation of the size groups, it is sometimes possible to obtain reasonably reliable values for the two radii. For broad distributions, only the maximum $r_c$ can be estimated.

Some conditions suitable for kinetic studies under these limitations have been established. sulfuric acid condensation nuclei is readily formed in a humid SO$_2$ atmosphere irradiated by ultraviolet light or ionizing radiations. Immediately after formation, the condensation nuclei possesses a broad size distribution characterized by single structureless scattering and light attenuation curves. However, the condensation nuclei soon coalesce and form larger particles with a much narrower size distribution and reliable measurements of $n$ and $r_c$ may be made with the discriminator and method described above. The concentration of nuclei $n$ has been found to be proportional to the time of radiation up to particle concentrations of about $4 \times 10^5$ per cm$^3$. This work was carried out with a 1 microcurie Sr$^{90}$-Y$^{90}$ beta-ray source at 10 Torr initial water vapor pressure, 0.78 ppm SO$_2$ and 740 Torr filtered tank air. Under these conditions a large response was obtained and measurements were made at the first absorbance level of FIG. 2.

As a tool for research, the nuclei discriminator also has been used for some exploratory studies in reaction kinetics. It was found that carbon monoxide and methane appreciably diminish the number of nuclei formed in beta-irradiated air containing 2.53 ppm SO$_2$. It is believed that these organic compounds interfere with the oxidation of SO$_2$ by OH radicals formed by beta irradiation of the air-water system. This competition may be represented as follows:

SO$_2$ + OH → condensation nuclei
CO + OH → no condensation nuclei
CH$_4$ + OH → no condensation nuclei Thus, by measuring the relative inhibition of condensation nuclei formation by CO and CH$_4$ separately, it is possible to deduce the relative rate constant, k(CO + OH)/k(CH$_4$ + OH). At 25°C. a ratio of 22.9 was found through use of the above-described discriminator and method. This result compares favorably with a literature value of 16.8 (N. R. Greiner, *J. Chem. Phys.* 46, page 2795 (1967)).

It can be seen from the above that the present invention provides an improved condensation nucleus discriminator which, in a single reading of transient conditions, determines not only the absolute concentration of nuclei but also the critical radius. The determination of nuclei concentration is absolute in that no separate calibration is needed. Because of the sensitivity in detecting particles as small as 10 to 200 A in radius, condensation nucleus discriminators as described can be used to study the minute chemical changes involved in gas-to-particle conversion reactions which is of major importance in environmental research and studies.

The embodiments of the invention in which an exclusive property of privilege is claimed are defined as follows:

1. A condensation nucleus discriminator comprising:

a housing defining an internal chamber and having a plurality of ports for access to said chamber including ports for evacuating said chamber, introducing a known pressure of a known vapor into said chamber, and admitting a gaseous sample having condensation nuclei of unknown size and concentration;

pressure reduction means for expanding the vapor within said chamber by a known amount at a controlled rate to produce a cloud of vapor condensation onto said nuclei;

pressure sensitive means for monitoring the pressure within said chamber during said expansion;

a monochromatic light source disposed to pass a beam of light through said chamber during said pressure reduction;

first light sensitive means for monitoring scattered light from said light source and providing an output representative of the scattered light intensity;

second light sensitive means for monitoring direct light from said light source and providing an output representative of the direct light intensity; and electrical means coupled to said second light sensitive means for generating an output proportional to absorbance from the change in direct light during said expansion; and recording means for providing time correspondence in changes of pressure, forward scattered light and light absorbance within said chamber, whereby the critical radius and concentration of said nuclei within said sample are determined.

2. The discriminator of claim 1 wherein said pressure reduction means comprises an evacuable vessel of known volume coupled to said chamber by valve means for controlling the time and the rate of expansion.

3. The discriminator of claim 1 wherein said electrical means comprises a controllable voltage source with circuitry for monitoring the output from said second light sensitive means and for producing a supply voltage of sufficient magnitude to both said first and second light sensitive means to maintain the output of said second means at constant level and to compensate the output of said first means for secondary attenuation of scattered light within said chamber.

4. The discriminator of claim 1 wherein there is provided means for particle and electromagnetic radiation of said nuclei before said expansion.

5. The discriminator of claim 1 wherein there is provided means for diluting said sample with filtered gas within said chamber.

6. The discriminator of claim 1 wherein said first light sensitive means comprises a photosensitive element disposed to intercept forward scattered light and produce an output corresponding to the intensity of said forward scattered light.

7. A method of rapidly and simultaneously determining the absolute concentration and the critical radius of condensation nuclei within a gas sample comprising:

providing said gas sample at a known temperature, pressure and humidity;

reducing the pressure of said gas sample by a monitored amount during a known time period to produce a cloud of growing condensation particles, and generating a signal representative of pressure over said time period;

passing a beam of monochromatic light through said cloud;

sensing the intensity of scattered light from said beam during said pressure reduction, and generating a signal representative of scattered light;

sensing the intensity of direct light transmitted through said cloud during said pressure reduction and generating a signal representative of direct light;

electrically generating a signal representative of light absorbance from the change in direct light intensity; and simultaneously recording signals representative of pressure, intensity of scattered light, rate of change in scattered light, and light absorbance within said cloud during said known time period and determining the concentration and critical radius of nuclei therefrom.

8. The method of claim 7 wherein said scattered light is determined by photoelectrically sensing the intensity of light scattered in a forward direction.

9. The method of claim 7 wherein both said scattered and transmitted light are sensed with photomultiplier devices, each having voltage outputs corresponding to respective light intensities, the output corresponding to direct light being monitored and the supply of voltage to each of said devices being varied to maintain said output corresponding to direct light at a constant level.

10. The method according to claim 9 wherein the change in said supply voltage is monitored as corresponding to light absorbance in said gas sample.

11. The method of claim 7 wherein said known time period is of 0.1 to 2 seconds in length.

12. The method of claim 7 wherein said pressure reduction is performed as a generally adiabatic process.

* * * * *